(No Model.)
R. HARDIE.
REDUCING VALVE FOR AIR AND GAS.
No. 246,309. Patented Aug. 30, 1881.
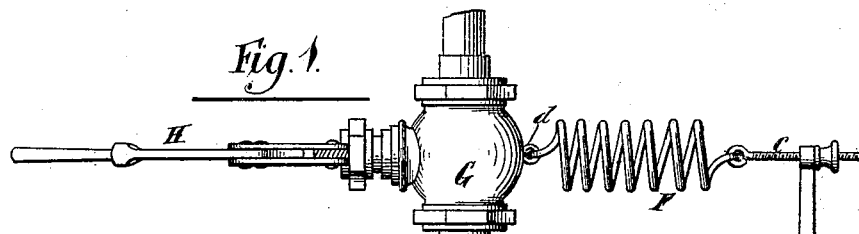
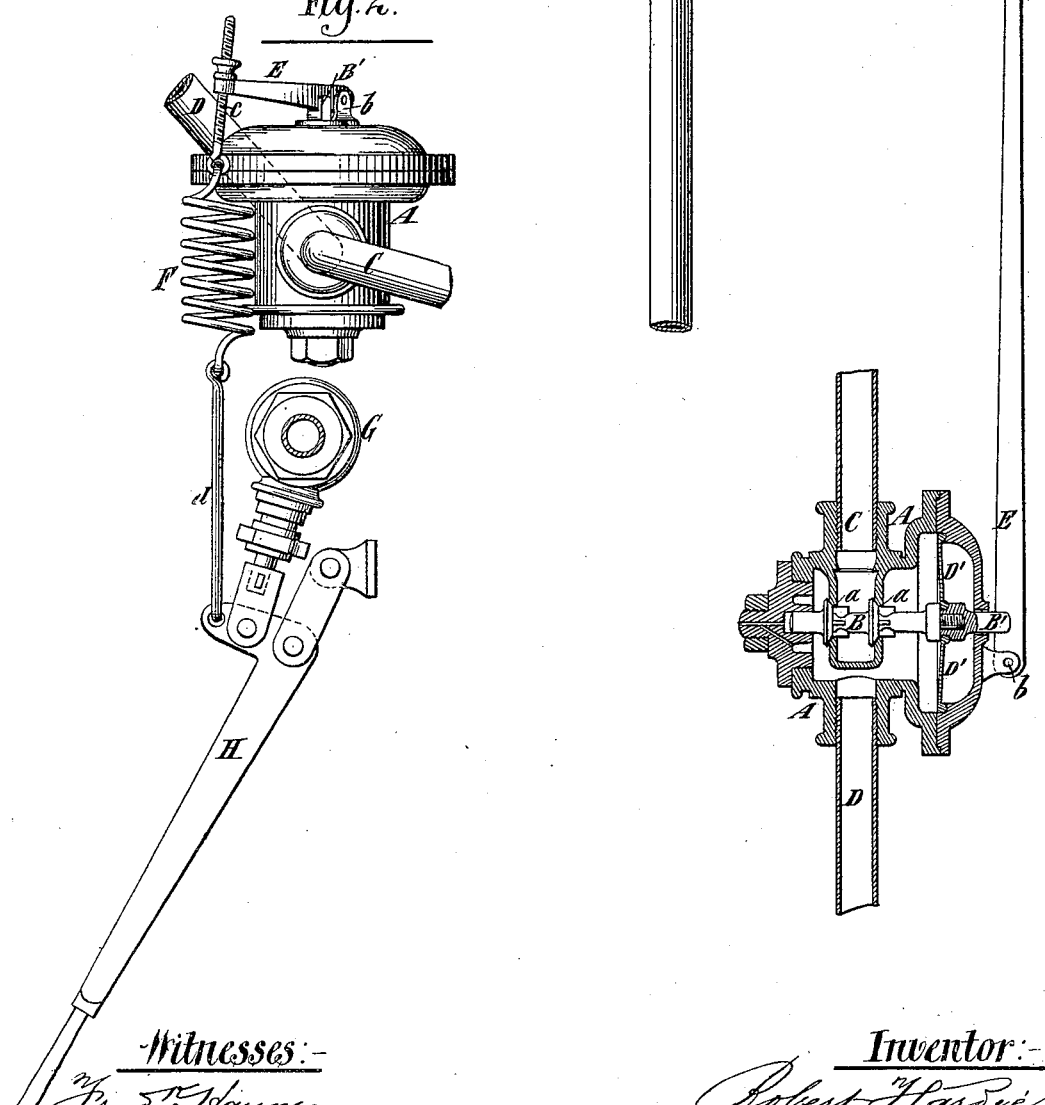
Witnesses:—
Fred. Haynes
Thomas E. Birch
Inventor:—
Robert Hardie
by his Attorneys
Brown & Brown

UNITED STATES PATENT OFFICE.

ROBERT HARDIE, OF HOBOKEN, NEW JERSEY, ASSIGNOR TO THE PNEUMATIC TRAMWAY ENGINE COMPANY, OF NEW YORK, N. Y.

REDUCING-VALVE FOR AIR AND GAS.

SPECIFICATION forming part of Letters Patent No. 246,309, dated August 30, 1881.

Application filed January 26, 1881. (No model.)

*To all whom it may concern:*

Be it known that I, ROBERT HARDIE, a resident of the city of Hoboken, in the county of Hudson and State of New Jersey, have invented certain new and useful Improvements in Reducing-Valves for Air and Gas, of which the following is a specification.

Although my invention may be employed in any situation where it is desired to reduce air or gas from a very high pressure to a moderate pressure before using it, it is particularly applicable to locomotives or other engines which are run by compressed air, and it is to be employed in connection with reducing - valves which are closed by the air of reduced pressure acting upon a diaphragm. In such engines, after the throttle-valve is shut off, the air of reduced pressure will not exert a sufficient force upon the diaphragm to close the reducing-valve until the pressure of air in the reduced-air tank is higher than, or at least as high as, the ordinary working-pressure, and therefore the pressure in the reducing-tank is at its highest point when the reducing-valve is closed and the engine is at rest. The reducing-valve itself is usually balanced, and the resistance to the movement of the diaphragm is offered by a spring and lever.

The object of my invention is to provide means for conveniently lessening the resistance offered to the movement of the diaphragm by the air or gas when the throttle-valve is closed, so that a less pressure of reduced air or gas will serve to close the reducing-valve.

To this end my invention consists in the combination, with a reducing-valve and a diaphragm, upon which the air or gas of reduced pressure acts to close the valve, and a lever bearing upon the valve-stem, of a spring connected at one end with said lever, and a hand-lever or other device connected with the other end of said spring, and adapted to be adjusted for increasing or diminishing the resistance offered by said spring to the closing of the reducing-valve. The said spring is preferably connected with the hand-lever of the throttle-valve, and the resistance offered to the closing of the reducing-valve is caused to be lessened by the closing of the throttle-valve.

In the accompanying drawings, Figure 1 represents a sectional view of a reducing-valve and a side view of a throttle-valve connected according to my invention, and Fig. 2 represents a plan thereof.

Similar letters of reference designate corresponding part in both the figures.

The particular kind of reducing-valve here represented is one which I prefer to use; but it, in itself, forms no part of my invention.

A designates a shell or body, in which are two valve-seats, $a\ a$, to which is fitted a double-beat valve, B, which is nearly balanced. Upon the upper side of the shell or body is a pipe, C, which conducts compressed air or gas from a storage tank or reservoir, and upon the under side thereof is a pipe, D, through which air of reduced pressure passes from the valve and enters a tank containing air or gas of reduced pressure to be employed as a motive agent.

The valve-stem B' projects through the shell or body A, and is connected within said shell or body with a diaphragm, D', which is exposed to the action of the air or gas of reduced pressure.

E designates a lever, fulcrumed at $b$ and adapted to bear upon the end of the valve-stem B', and to the upper end of this lever is connected one end of a spring, F, which offers resistance to the movement of the diaphragm sufficiently to close the valve B.

It will be readily seen that in the ordinary operation of the reducing-valve the spring F will hold the valve open until the power of air of reduced pressure upon the diaphragm D' is sufficient to overcome the resistance of said spring, whereupon the valve will be closed and remain closed until the air of reduced pressure will permit the diaphragm to be moved and the valve opened by the action of said spring.

G designates a throttle-valve of the common kind, which may be opened and closed by a lever, H, and to one arm of said lever is secured the end of the spring F, so that when said lever is moved to close the throttle the resistance of said spring will be lessened, while when moved to open the throttle the spring will be distended and its resistance increased. The spring F is connected with the lever E by means of a screw-threaded rod, c, and nut, which provides for adjusting the power of the spring to permit the closing of the valve when the reduced air reaches a predetermined pressure; and said spring is connected by a link, d, with the lever H.

It will be readily seen that when the throttle-valve is shut the passage of compressed air or gas through the reducing-valve will be interrupted and the valve closed before the pressure of the reduced air in its tank or reservoir reaches the ordinary working-pressure.

Although the spring F is here shown as connected directly with the throttle-lever H, it might be connected with a separate lever or other device for effecting the same purpose.

What I claim as my invention, and desire to secure by Letters Patent, is—

1. The combination, with a reducing-valve and a diaphragm, upon which the air or gas of reduced pressure acts to close the valve, and a lever bearing upon the valve-stem, of a spring connected at one end with said lever, and a hand-lever or other device connected with the other end of said spring, and adapted to be adjusted for increasing or diminishing the resistance offered by said spring to the closing of the said reducing-valve, substantially as specified.

2. The combination, with a reducing-valve and a diaphragm, upon which the air or gas of reduced pressure acts to close the valve, and a throttle valve and lever, of a lever bearing upon the valve-stem of said reducing-valve, and a spring connected at one end to the last-mentioned lever and at the other end to the throttle-lever, substantially as specified.

ROBT. HARDIE.

Witnesses:
FREDK. HAYNES,
A. C. WEBB.